United States Patent [19]

Threadgill

[11] Patent Number: 4,652,372

[45] Date of Patent: Mar. 24, 1987

[54] LIQUID SEPARATOR

[75] Inventor: James A. Threadgill, Rolling Meadows, Ill.

[73] Assignee: Master Chemical Corporation, Perrysburg, Ohio

[21] Appl. No.: 721,275

[22] Filed: Apr. 8, 1985

[51] Int. Cl.$^4$ .............................................. B01D 15/02
[52] U.S. Cl. .............................. 210/242.3; 210/242.4; 210/526; 210/923; 210/924
[58] Field of Search ............... 210/776, 780, 783, 670, 210/671, 680, 242.3, 242.4, 525, 526, 922, 923, 924; 209/47, 49, 166, 168, 171, 172, 307

[56] References Cited

U.S. PATENT DOCUMENTS 4,511,461 4/1985 Kruyer .................................. 210/783

Primary Examiner—Frank Sever
Attorney, Agent, or Firm—Freeman Crampton; Alfred L. Patmore, Jr.

[57] ABSTRACT

A liquid separator utilizing an endless belt for skimming extraction of oil from a liquid body and doctoring rollers for gathering the oil from both sides of the belt.

20 Claims, 7 Drawing Figures

LIQUID SEPARATOR

This invention relates to a liquid separator, and, more particularly, to an extractor for skimming one liquid from another in a quiescent body by the use of a continuous flexible belt having surface oleophilic characteristics and a unique arrangement for stripping the salvage from the belt.

With the ever increasing awareness of environmental cleanup many devices have been developed for applications from the separation of pollutant liquids from natural water bodies to the removal of such pollutants from aqueous industrial solutions before an effluent discharge.

In the field of separating immiscible liquids, skimming devices including belts have been used to gather the floating liquid and carry it to a collection area. In the specific area of removing relatively small quantities of tramp oil, of the order of 1 to 10 gallons per hour, from an aqueous solution, such as cooling liquids used in machining operations, there are relatively few practical devices. One such device is shown in U.S. Pat. No. 4,274,957 issued to Joseph A. Koller.

In the Koller device, a vertically suspended belt passes between an upper drive roller and a lower roller submerged in the liquid being separated. An off center deflection roller is biased against the top of the drive roller, and oil which collects at the nip of the rollers travels outwardly past the belt edges to the edge of the drive roller where it drips into a collection channel. The oil is thus squeezed from one surface of the belt along a single line of contact.

Another example of a belt type device is shown in U.S. Pat. No. 4,154,683 issued to Henry Timmer et al. This is a two stage oil separator in which the first stage utilizes a vertically extending belt to transfer the oil or oil and water mixture to an area where it is separated in a second stage by a disc separator. The liquid carried up by the belt is removed from the belt by the squeezing action between a lower drive roller and a top tension roller in a manner, as the patentees explain, similar to that of the old style laundry wringer.

U.S. Pat. No. 3,617,552 to Robert G. Will et al shows another type of belt device which could be characterized as a two stage wringer in that water is removed from the outside layer of a laminated belt by a squeegee roll which presses gently toward the drive roller and then the oil is removed by a second squeegee roller which squeezes more vigorously against the driven roller.

Another squeeze type belt separator is shown in U.S. Pat. No. 3,695,451 to Henry Schmidt, Jr. et al in which the belt is passed between a lower drive roller and an upper spring tensioned roller. Other types of belt devices which are commercially available utilize a metallic belt from which the oil is removed by wiper blades pressing against the belt surface.

It is an object of this invention to provide a new and improved belt type separator in which the oil skimmed by the belt is salvaged from the belt in a more efficient and complete manner.

The object and resultant advantages of the present invention are realized in a liquid separator for removing oil from a liquid body in which an endless belt fabricated from a material exhibiting oleophilic characteristics on its surface is disposed in a general vertical direction passing into the liquid body in a bottom loop extending from a descending belt flight into the liquid body to a rising belt flight extending out of the liquid body. A bottom roller is freely suspended within this bottom belt loop for retaining the belt within the liquid body. A top roller is mounted with its axis substantially horizontal around which the belt is entrained from the rising belt flight to the descending belt flight. This top roller is normally driven to impart motion to the belt.

The top roller has a belt engaging arbor section that is the same width as the belt and it has cheeks which diverge outwardly from the ends of the arbor section to provide centering for the belt should the belt veer toward either side. The arbor section has a plurality of radially extending collars with their outer surfaces knurled to engage the belt in driving contact. The spaces between the collars provide channels for the retention of liquid on the belt as the belt passes around the driven roller. There is a channel at each end of the arbor section, and normally the collars are equally spaced and of equal width. The collar construction of the drive roller provides a positive belt drive without significantly sacrificing the oil carrying capacity of the belt.

The oil is normally removed from both sides of the belt downstream of the top driven roller in the descending flight of the belt toward the bottom roller. Doctoring means in the form of rollers are used to separate or remove the salvage oil from the belt with a minimum amount of frictional wear to the belt compared to stationary doctor blades. The first doctoring roller has its axis parallel to the top driven axis and is in rolling contact with the outside surface of the descending belt flight in order to separate the oil on the outside of the belt from its surface to form a first trough between the roller and the belt for gathering of such separated oil. This first doctoring roller is downstream from the drive roller and deflects the belt inwardly from a normal downward flight line of the belt between the drive and bottom rollers. This assures the mentioned doctoring roller will be in rolling wrap contact with the belt for an arc of between 30 and 90 degrees about the axis of rotation of the roller. Preferably, this angle of wrap is of the order of 60 degrees. This large of an angle of rolling contact is created by the inward deflection as stated above in combination with the outward devlection of the belt downstream of this first doctoring roller. Normally this outward deflection is created by a second doctoring roller having its axis parallel to and below or downstream from the first doctoring roller axis. This places the second doctoring roller in rolling contact with the inside surface of the descending belt flight to separate the oil on the inside of the belt from its surface to form a second trough between the roller and the belt for gathering this separated oil. This deflection of the belt outwardly from its normal downward flight line establishes an area of rolling wrap contact between the second doctoring roller and the belt for an arc of between 30 and 90 degrees, preferably 60 degrees, about the axis of rotation of the roller.

The first doctoring roller has a belt engaging arbor section substantially the same width as the belt with cheeks extending outwardly from each end of the arbor section. At least one of the cheeks diverges outwardly from one end of the arbor section to define an oil channel at one edge of the belt in communication with the gathering through to provide a flow path for the oil being collected to the inside belt surface and for free fall to a collector located below. Conveniently, both cheeks diverge outwardly at the same angle of approximately 30 degrees to a line diametric to the arbor section so as to provide an oil channel at each edge of the belt in communication with the gathering trough.

The second doctoring roller has a belt engaging arbor section substantially the same width as the belt but with cheeks having inwardly facing surfaces which extend normally outward from the ends of the arbor section to block the flow of oil around the belt thus confining the flow from the second trough to a position vertically above and for receipt by the collecting trough located therebelow. Preferably the cheeks are caused to diverge outwardly at a small angle such as one degree to a line diametric to the arbor section to avoid any belt interference to the smooth passage of the belt over the blocking roller.

The collector means is in the form of a simple L-shaped channel located below the top and first and second doctoring rollers for receiving oil separated from the belt and flowing from the troughs of the first and second doctoring rollers. This collecting means is tilted downwardly from the horizontal at end to feed a free fall gravity passage.

The first and second doctoring rollers are preferably driven independently but in synchronism with the movement of the belt. In the preferred embodiment the top roller is driven directly by a motor drive, and the drive roller and both the first and second doctoring rollers have annular grooves for receiving an endless drive band for driving both doctoring rollers in synchronism with the drive rollers. These grooves conveniently are of the same diameter to cause the first and second doctoring rollers to rotate at the same speed as the drive roller. Preferably, the drive band is looped around the drive roller and the second doctoring roller in their respective grooves with one flight of the drive band engaging and entrained against the groove in the first doctoring roller to thereby drive the rollers independently of but in the same peripheral direction as the belt is being moved by the drive roller. The arbor engaging diameter of the drive roller is preferably greater than the arbor engaging diameters of the first and second doctoring rollers which preferably are the same. This will cause the first and second doctoring rollers to be driven at a peripheral speed less than the speed of the belt, thereby producing relative slippage between the rollers and the belt. A primary reason for driving the doctoring rollers independently of the belt is to assure their constant rotation in spite of the pickup of detritus such as metal chips which could produce such a disturbance between the belt and doctoring roller so as to cause the belt to jam or bow out between the various rollers. The doctoring rollers will function to separate the oil from the belt when they are rotated by the belt.

The presently preferred embodiments of the invention are illustrated in the accompanying drawing in which.

Figure 1:
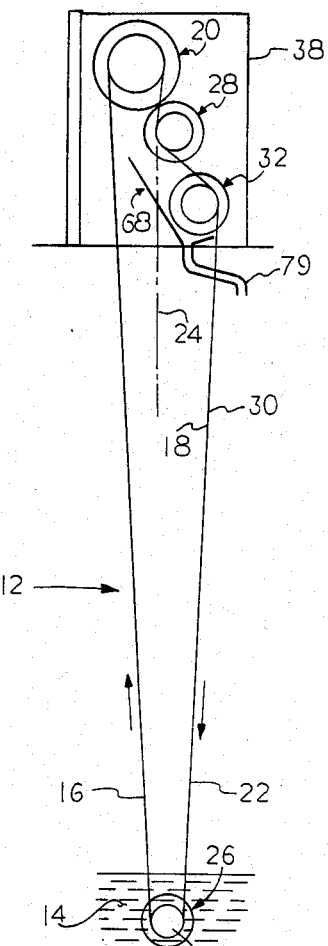
FIG. 1 is a schematic of the liquid separator according to the invention showing the belt extending into the body of the liquid from which the oil is being skimmed.
Figure 2:
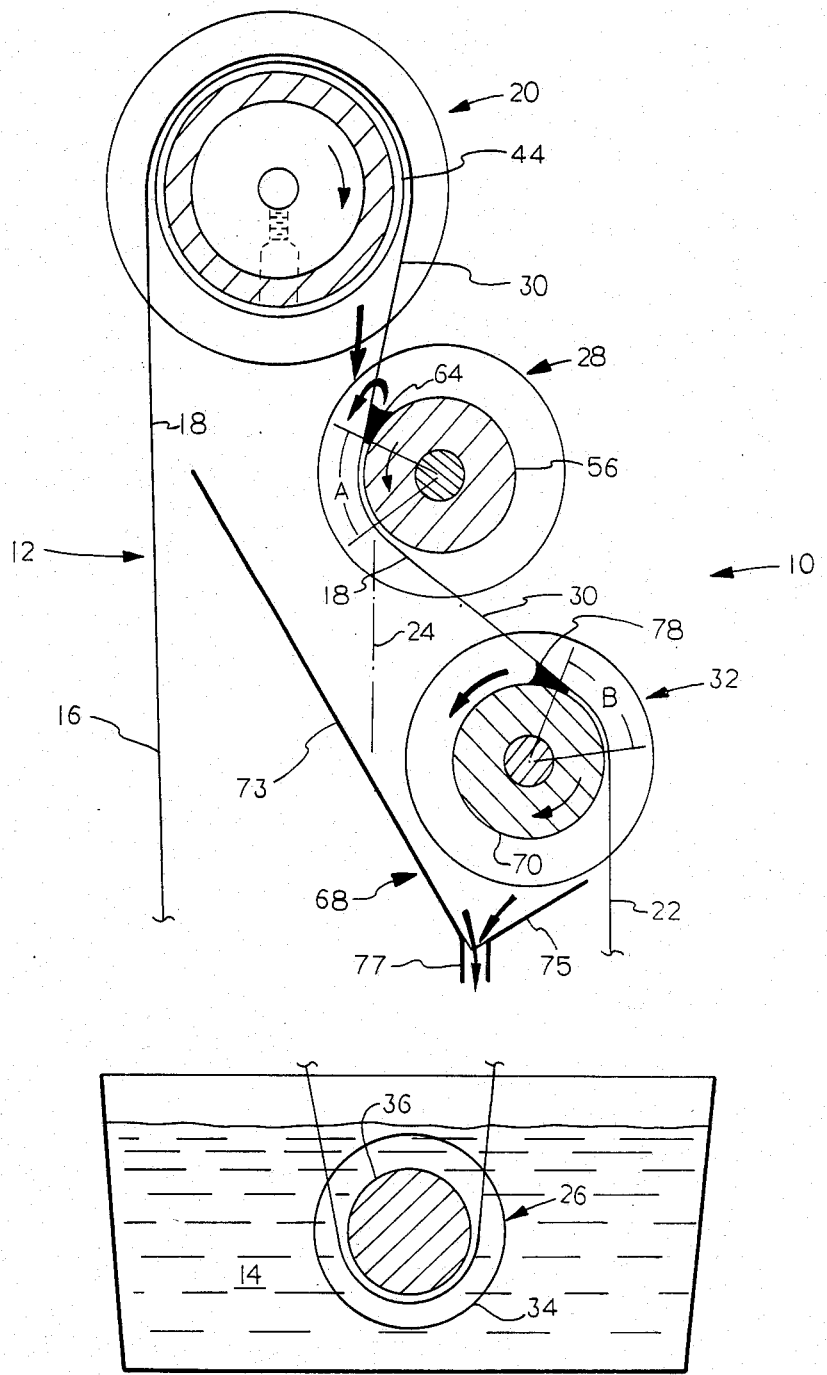
FIG. 2 is a schematic view of the separator showing the oil gathering troughs and flow of separated oil from the belt and the belt path, broken for convenience, into the body of liquid from which the oil is being skimmed.

Referring to FIGS. 1 and 2, the liquid separator 10 has as its media for extracting one immiscible liquid from another, an endless belt 12 fabricated from a material which is preferentially wetable by the liquid to be extracted. In its usual form for removing oil from a liquid body containing oil as an ingredient, the belt would be fabricated from a material exhibiting oleophilic characteristics on its surfaces so that the oil will be attracted to and cling to both surfaces of the belt.

Belt 12 travels upwardly from the body 14 of liquid being separated in a rising belt flight 16 with its inner belt surface 18 being entrained around drive roller 20 being driven in a clockwise direction, as viewed in FIGS. 1 and 2. Belt 12 leaves drive roller 20 in a descending belt flight 22 to be deflected inwardly from a normal flight path 24, shown by a dashed line, between top roller 20 and a bottom roller 26, by an upper doctoring roller 28 which engages the outer belt surface 30 in rolling contact. Outer belt surface 30 is in rolling wrap contact with roller 24 for an arc, shown as being subtended by angle A in FIG. 2, between 30 and 90 degrees about its axis of rotation, preferably this angle of wrap is 60 degrees. The belt 12 is then deflected outwardly from the normal flight path 24 by a lower doctoring roller 32 having its axis parallel to and below the upper doctoring roller. Lower roller 32 like upper roller 28 is in rolling wrap contact with the inner belt surface 18 for an arc, shown as being subtended by angle B in FIG. 2, of approximately 60 degrees about its axis as it passes thereover. Belt 12 then continues in its descending flight path 22, entering the body of liquid 14 to be looped around bottom roller 26. Bottom roller 26 is freely suspended in the bottom loop of the belt and is weighted in order to maintain its submerged position within the liquid body. The weight of the roller 26 also provides the operating tension of the system. Cheeks 34 keep the belt confined on the arbor portion 36 of the bottom roller 26 resisting any tendency for the belt to climb out of the roller, particularly if some detritus gets entrained between the belt and arbor 36.

Figure 3:
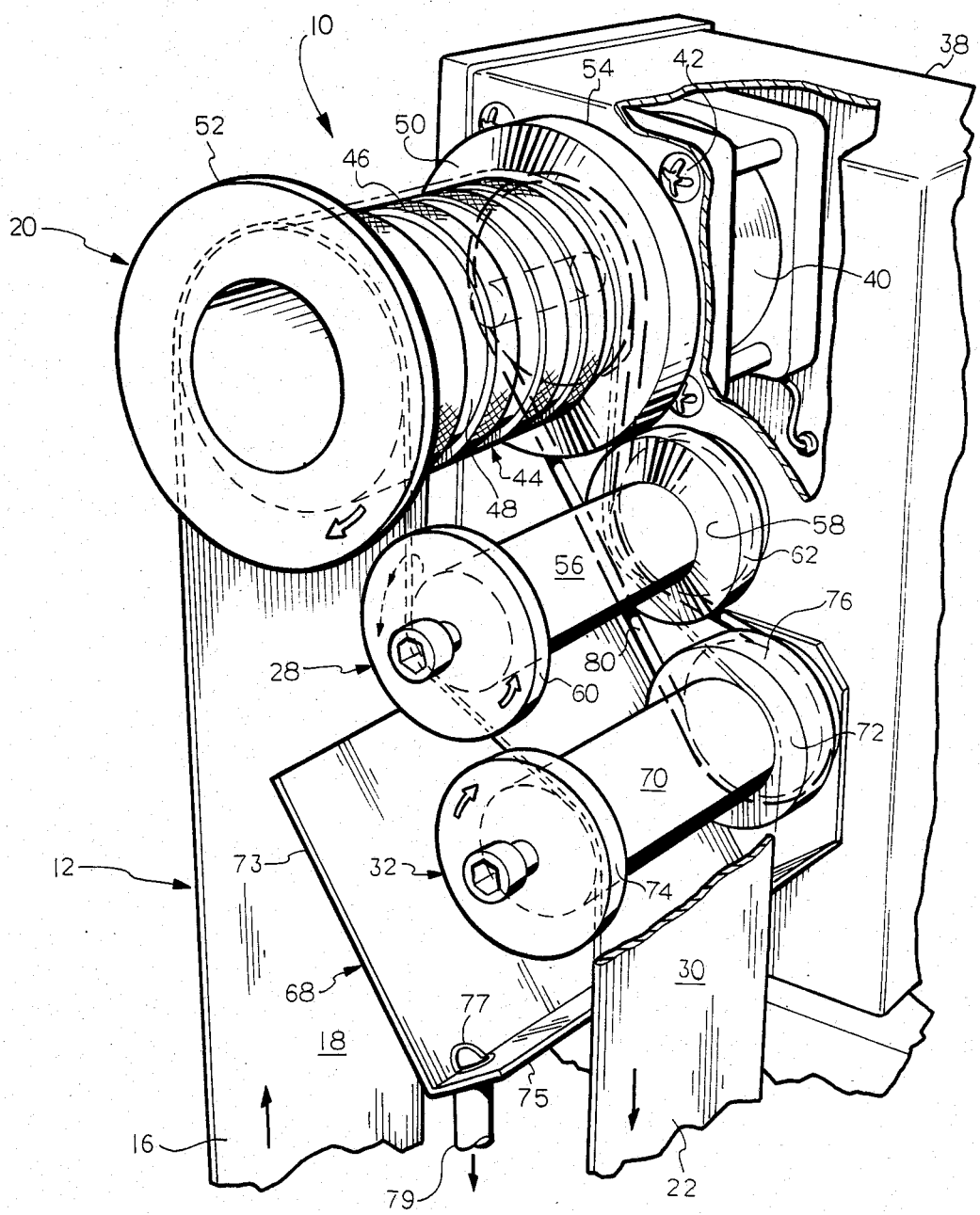
FIG. 3 is a perspective view of the liquid separator according to the invention showing the upper portion of the belt in contact with the top drive roller and the two doctoring rollers for separating oil from both sides of the belt.

As best seen in FIGS. 1 and 3, the driving and collecting components of the separator are mounted on an in equipment cabinet 38. Top drive roller 20 and upper and lower doctoring rollers 28 and 32 are mounted on cabinet 38 extending outwardly in a cantilevered fashion. Drive motor 40 is mounted inside the cabinet with screws 42. This provides a compact semiportable arrangement for this highly efficient separator. For example, in a 1 to 5 gallon per hour separator, a 3 inch belt would be used with an overall cabinet dimension of less than 12 inches high by 6 inches wide by 5 inches deep. Separator cabinet 38 can be mounted on the edge of an equipment sump servicing several machine tools for extracting undesirable tramp oil from a water based coolant. In smaller shops the collector unit can be moved between the individual machine tool sumps on a periodic basis. In some instances, the separator may be mounted on the top of a barrel that has been used to collect spent cooling fluid.

In the foregoing installations, it is easy to comprehend that variations in the liquid level of the body being treated will not affect the operation of the present belt separator as it would in other devices such as disc separators and the like. With the cantilevered design of the driving and doctoring rollers, the collection belt can be easily slid over the top roller with one side bearing against the upper doctoring roller and trained around the lower doctoring roller so that the belt will extend downwardly by gravity due to the weight of the bottom roller which is inserted in the bottom loop of the belt. The bottom roller is located in the collection sump at level 14 below the expected minimum level, and the equipment cabinet 38 is conveniently mounted on the sump framework to permit the salvage oil to be drained away.

Figure 4:
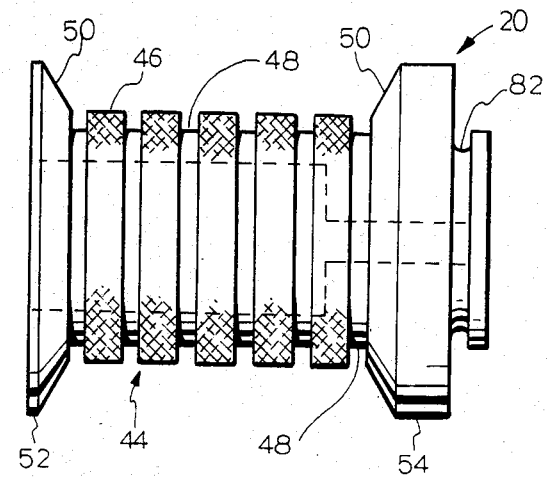
FIG. 4 is a side elevational view of the top driving roller showing the details of the fluted driving collars and oil channels.

As seen in FIGS. 3 and 4, the top driving roller is constructed with a belt contact arbor 44 equal to the width of the belt including a plurality of equally spaced knurled drive collars 46 to provide positive driving contact with the belt. The spaces 48 between the collars provide channels in which the oil clinging to the inner surface 18 of the belt can pass. A channel 48 is supplied at each end of the arbor section 44 to provide an oil path on both sides of each collar 46. Hydroplaning or unwanted belt slippage is thus eliminated providing a positive belt drive with the preservation of the oil being carried on the inside belt surface 18 around the drive roller 20. Roller 20 is constructed with outwardly diverging cheeks 50 which extend from each end of the arbor section 44 to the rollers shoulders 52 and 54 to provide a self-centering confinement for belt 12. These cheeks 50 are effectively constructed at an angle of approximately 30 degrees to a line diametric to the arbor section 44. Top roller 20 being driven in a clockwise direction as viewed in FIGS. 2 and 3 drives belt 12 entrained around the roller from its rising belt flight 16 to its descending belt flight 22.

The upper doctoring roller 28 is positioned and configured to coact and extract oil from the outer belt surface 30. Arbor section 56 extends the width of the belt to outwardly diverging cheeks 58 terminating in roller shoulders 60 and 62. As best seen in FIG. 2, as belt 12 passes around doctoring roller 28 in an arc of wrap of approximately 60 degrees, the nip between outer belt surface 30 and arbor 56 forms an oil gathering trough 64 extending over the width of belt 12 and arbor section 56. In order for the oil so gathered in trough 64 to escape, it flows in passages 65 at each edge of the belt as shown schematically in FIG. 4. These passages 65 are created at the edges of the belt at the line of contact 66 between the outer belt surface 30 and arbor 56 where cheeks 58 diverge outwardly. This allows the oil to separate from the belt edges where a substantial amount drops by gravity into collecting trough 68 as shown in FIG. 2, with a residual amount flowing along the edges of the inside belt surface 18 to be removed by lower doctoring roller 32. A functional cheek angle for the creation of passages 65 is approximately 30 degrees between cheek surface 58 and a line diametric to arbor section 56. In some instances, it may be desirable to direct the flow of oil from trough 64 in only an outward direction as viewed in FIG. 3 toward shoulder 60. In this case, only the outward cheek 58 would be directed in an outwardly diverging angle and the inward cheek 58 would extend normally outward to shoulder section 62 thus blocking the flow of oil from the inward edge of the belt.

Figure 6:
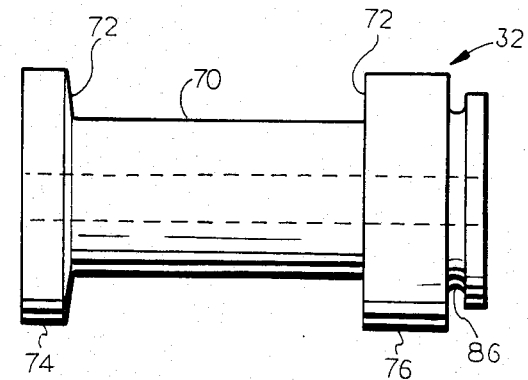
FIG. 6 is a side elevational view of the lower doctoring roller located between the upper doctoring roller and the bottom roll for separating oil from the inside surface of the belt and blocking further flow of oil down the belt.

Lower doctoring roller 32 is located downwardly and to the right of upper doctoring roller 28 as viewed in FIGS. 2 and 3, and it extends along a horizontal axis extending outwardly from equipment cabinet 38. The inner surface 18 of belt 12 contacts arbor section 70 of lower doctoring roller 32 in an arc of wrap of approximately 60 degrees. Arbor section 70 extends the width of the belt 12, and cheeks 72 extend substantially normally outward from the ends of arbor section 70. As shown in FIG. 6, cheeks 72 can extend outwardly from a line diametric to arbor section 70 at an angle of approximately 1 degree to provide adequate belt clearance. Cheeks 72 terminate at their outward end in shoulders 74 and 76. At the nip where the inside belt surface 18 contacts arbor section 70, an oil collection trough 78 is formed gathering the oil separated from the belt. Since the roller cheeks 72 extends substantially normally outward from the edges of the belt, the flow of oil to the other side of the belt is blocked thus forcing the oil to flow outwardly along the cheeks to drop by gravity into the collection channel 68. Collection channel 68 is formed with a longer leg 73 to catch the oil falling from troughs 64 and 78 and a shorter leg 75 forming a collection area from which the oil is withdrawn by drain 77. Drain 77 may have a flexible hose 79, as shown in FIG. 1, to direct the salvaged oil to containers not shown.

Figure 5:
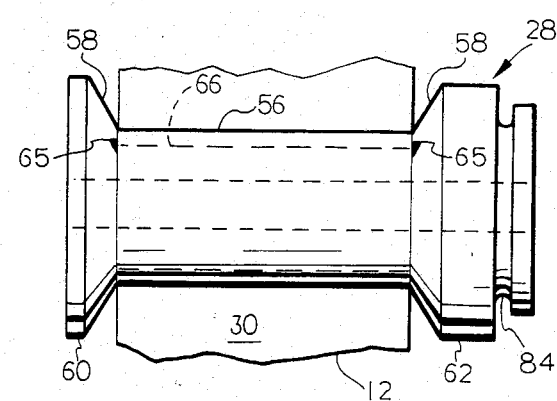
FIG. 5 is a side elevational view of the upper doctoring roller located immediately downstream of the drive roller for separating oil from the outside surface of the belt shown with outwardly diverging cheeks at both ends of the arbor section to create oil passages at both edges of the belt.
Figure 7:
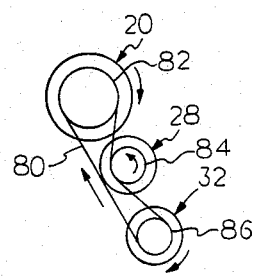
FIG. 7 is a schematic view of the drive band configuration for driving the upper and lower doctoring rollers.

Doctoring rollers 28 and 32 are driven in synchronism with belt 12. This can be accomplished by an endless drive band 80 as shown in FIGS. 3 and 7. Drive roller 20 and both doctoring rollers 28 and 32 have annular grooves 82, 84 and 86 respectively, formed outside of shoulders 54, 62 and 76 respectively, as individually shown in FIGS. 4-6. With endless band 80 looped around drive roller 20 in groove 82 and looped around lower doctoring roller 32 in its groove 86 they will rotate in the same clockwise direction as viewed in FIGS. 2, 3 and 7. One flight of the drive band engages the groove 84 and is trained against upper doctoring roller 28 to turn it in a counterclockwise direction. This will cause the arbor sections 56 and 70, the belt engaging peripheries of the upper and lower doctoring rollers 28 and 32, to travel in the same direction as the belt 12. With the groove diameters 82, 84 and 86 all being the same and the arbor 44 of the drive roller 20 being greater than the arbor diameters 56 and 70 of the upper and lower doctoring rollers, the peripheral speed of the doctoring roller arbors will be less than the speed of the belt passing thereover causing a relative slippage between the rollers and the belt for the extraction of oil from the belt surfaces in their respective troughs. The primary reason for driving the first and second doctoring rollers is to assure positive motion even if foreign material is carried by the belt and is temporarily wedged between the rollers and the belt. That is to say, in an alternate embodiment of the invention, drive band 80 and the cooperating roller grooves may be omitted, and the doctoring rollers will function to extract and gather the oil from both sides of the belt. While the top roller is shown as being driven directly by motor 40, it is obvious that the upper or lower doctoring rollers could be directly driven by the motor with power to the top roller being supplied by band drive 80.

The embodiments of the invention in which an exclusive property or privilege is claimed are defined as follows:

1. In a liquid separator for removing oil from a liquid body including oil as an ingredient thereof, comprising the combination of: an endless belt fabricated from a material preferentially wettable by oil, said belt extending in a generally vertical direction into the liquid body and being separated with a rising belt flight extending out of said liquid body and a descending belt flight extending into said liquid body; a top roller mounted with its axis substantially horizontal and around which said belt is entrained from said rising belt flight to said descending belt flight; a bottom roller within said belt at its lower end between said rising belt flight and said descending belt flight, said bottom roller maintaining said belt within the liquid body; means for driving said belt; the provision of means designed for salvaging oil skimmed by the belt in a more efficient manner than wringer roll separators including a first doctoring roller having its axis parallel to and spaced below said top roller axis being in rolling contact with the outside surface of said descending belt flight to separate the oil on the outside of the belt from the said surface and forming a first trough between said roller and said belt for gathering of such separated oil; a second doctoring roller having its axis parallel to and spaced below said first doctoring roller axis, said roller being in rolling contact with the inside surface of said descending belt flight to separate the oil on the inside of the belt from said surface and to form a second trough between said second roller and said belt for gathering such separated oil; said top roller being driven by said drive means and having means for precluding hydroplaning and unwanted belt slippage and providing a positive belt drive without significantly sacrificing the oil carrying capacity of the belt including adjacent arbor portions certain of which have a greater diameter than the diameter of other of said portions, the greater diameter portions contacting the belt, and the remaining portions have no contact with the belt to provide an area on the belt for liquid retention; and collector means below said first and second doctoring rollers extending above the liquid body for the width of said belt and adapted to receive oil from said first and second gathering troughs.

2. The liquid separator according to claim 1 further including means designed to assure positive motion of the belt even if foreign material is carried by the belt and is temporarily wedged between the rollers and the belt including the means for driving the belt which embraces means for driving said top and both said doctoring rollers.

3. The liquid separator according to claim 1 wherein said first and second doctoring rollers are each in rolling wrap contact with said belt for an arc of between 30 and 90 degrees about the axis of rotation of each of said rollers.

4. The liquid separator according to claim 3 wherein said rolling wrap contact extends over an arc of approximately 60 degrees about the axis of each of said doctoring rollers.

5. The liquid separator of claim 1 wherein said first doctoring roller has a belt engaging arbor section substantially the same width as said belt and a cheek diverging outwardly from the one end of said arbor section to define an oil channel at one edge of said belt in communication with said first trough providing a flow path for liquid collected in said first trough to said inside belt surface and for free fall to the collector means.

6. The liquid separator of claim 5 wherein said cheek has an inwardly facing surface that diverges outwardly at an angle of approximately 30 degrees to a line diametric to said arbor section thereof.

7. The liquid separator according to claim 5 wherein said second roller has a belt engaging arbor section substantially the same width as said belt; and
  cheeks extending outward from the ends of said arbor section to thereby block flow of oil around said belt confining the flow of oil from said first and second troughs to said collector means.

8. The liquid separator of claim 1 wherein said first doctoring roller has a belt engaging arbor section substantially the same width as said belt; and
  cheeks diverging outwardly from the ends of said arbor section to define oil channels at each edge of said belt in communication with said first trough providing flow path for liquid collected in said first trough to said inside belt surface and for free fall to the collector means.

9. The liquid separator according to claim 1 wherein said second doctoring roller has a belt engaging arbor section substantially the same width as said belt; and
  cheeks having inwardly facing surfaces extending normally outward from the ends of said arbor section to thereby block flow of liquid around said belt thus confining flow thereof from said second trough to positions vertically above and in line with said collector means.

10. The liquid separator according to claim 9 wherein said cheeks diverge outwardly approximately 1 degree to a line diametric to said arbor section thereof.

11. The liquid separator according to claim 1 further including means designed to provide constant rotation of the doctoring rollers despite pickup of detritus including the means for driving belt which embraces means for driving said first and second doctoring rollers independent of and in the same direction as the belt passing thereover.

12. The liquid separator according to claim 11 wherein said means for driving said belt includes means for driving said first and second doctoring rollers at a peripheral speed less than the speed of the belt passing thereover causing relative slippage between said rollers and belt.

13. The liquid separator of claim 1 wherein said top driven roller has its arbor portions occupying substantially the same width as said belt and having cheeks diverging outwardly from the ends of said arbor portions to provide centering of said belt.

14. The liquid separator of claim 13 wherein the belt contacting arbor portions of said top driven roller includes a plurality of radially extending collars having knurled outer surfaces and said remaining arbor portions provide relief channels in the spaces between said collars for the retention of liquid on said belt as it passes the driven roller.

15. The liquid separator of claim 14 wherein said outer knurled collar outer surfaces define a belt contacting arbor surface of greater diameter than the belt contacting arbor surface of the first doctoring roller.

16. The liquid separator of claim 14 wherein said plurality of collars are equally spaced forming a plurality of liquid retention channels of equal widths, one of said channels being contiguous to each end of said arbor section.

17. The liquid separator of claim 13 wherein the cheeks of said top roller diverge outwardly at an angle of approximately 30 degrees to a line diametric to the arbor.

18. In a liquid separator for removing oil from a liquid body including an oil ingredient comprising the combination of: an endless belt fabricated from a material exhibiting oleophilic characteristics on its surface, said belt being disposed in an elongated substantially vertically extending loop when in use for conveying oil from said liquid body to a point of separation; a drive roller confined in the top loop of said belt mounted above said liquid body for imparting motion to said belt; a bottom roller within the bottom loop of said belt for retaining the belt within said liquid body; the provision of means designed for salvaging oil skimmed by the belt in a more efficient manner than wringer roll separators including a first doctoring roller downstream and spaced below said drive roller deflecting said belt inwardly from a normal downward flight line between said drive and bottom rollers to separate the oil on one surface of the belt from said surface and form a first trough between said roller and said belt surface for ggthering oil separated from said one surface of said belt; said first doctoring roller having a belt engaging arbor portion substantially the same width as said belt and cheeks diverging outwardly from the ends of said arbor portion defining oil channels on each edge of said belt in communication with said first trough providing a flow path for oil gathered in said first trough to the other surface of said belt for flow therealong downstream of said first doctoring roller; a second doctoring roller, downstream and spaced below said first doctoring roller deflecting said belt outwardly from said normal downward flight line to separate the oil on the surface of the belt and form a second trough between said roller and said belt other surface for gathering oil separated from said other surface of said belt; said second doctoring roller having a belt engaging arbor portion substantially the same width as said belt and cheeks extending substantially radially outward from the ends of said arbor portion blocking the flow of oil around said belt edges thus constraining the flow from said second trough to discharge by overflow therefrom for free falling from said second trough; said drive roller having means for precluding hydroplaning and unwanted belt slippage and providing a positive belt drive without significantly sacrificing the oil carrying capacity of the belt including adjacent arbor portions certain of which have a greater diameter than the diameter of other of said portions, the greater diameter portions contacting the belt, and the remaining portions having no contact with the belt to provide an area on the belt for liquid retention; and collector means below said first and second doctoring rollers for receiving oil falling from said first and second troughs.

19. The liquid separator of claim 18 having, in combination:
 means for driving said first and second doctoring rollers in synchronism with said drive roller including annular grooves in said driven, first and second rollers, and an endless drive band looped around said drive roller and said second doctoring roller in their respective grooves with one flight of said drive band engaging the groove and trained against said first doctoring roller groove to thereby drive said rollers independent of and in he same peripheral direction as said belt is moved by said drive roller.

20. In a liquid separator designed for salvaging oil skimmed by a belt from a liquid body having an oil ingredient in a more efficient and complete manner comprising the combination of: an endless belt of material exhibiting surface oleophilic characteristics disposed in an elongated substantially vertically extending loop; a bottom roller within the bottom end of the belt loop for retaining said belt bottom end within the liquid body; doctoring and collecting means above the liquid body and bottom roller and below the top of said loop in contact with said belt for dislodging and collecting oil carried by the belt from the liquid body; and means in engagement with the upper end of the belt for supporting the belt for movement in circuit from and to the bottom roller to and from positions above the liquid body and said doctoring and collecting means, said engagement means designed for precluding hydroplaning or unwanted belt slippage and to provide a positive belt drive without significantly scarificing the oil carrying capacity of the belt even if foreign material is carried by the belt including a roller having a plurality of coaxial adjacent arbor portions, each of certain of said arbor portions having a greater diameter than the diameters of each of certain other of said arbor portions and adapted to engage the belt over limited belt surface areas of contact to support the belt and allow the remaining areas of the belt to pass without engagement to the doctoring and collecting means for increased oil separation and collection.

* * * * *